United States Patent
Masuda et al.

(10) Patent No.: US 6,201,810 B1
(45) Date of Patent: Mar. 13, 2001

(54) HIGH-SPEED ROUTING CONTROL SYSTEM

(75) Inventors: Michio Masuda; Motoo Nishihara; Makoto Ogawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/910,117

(22) Filed: Aug. 13, 1997

(30) Foreign Application Priority Data

Aug. 15, 1996 (JP) .................................. 8-215678

(51) Int. Cl.[7] .................................. H04L 12/56
(52) U.S. Cl. .................. 370/395; 370/237; 370/238; 370/408
(58) Field of Search .................. 370/237, 238, 370/254, 255, 256, 395, 400, 408

(56) References Cited

U.S. PATENT DOCUMENTS 5,233,604 * 8/1993 Ahmadi et al. .................. 370/238

FOREIGN PATENT DOCUMENTS 3-242063  10/1991  (JP) .

* cited by examiner

Primary Examiner—Wellington Chin
Assistant Examiner—Frank Duong
(74) Attorney, Agent, or Firm—Foley & Lardner (57) ABSTRACT

In a high-speed routing control system, plural path candidates each leading to a destination node are selected on the basis of physical connection information of links connecting respective nodes in a path candidate selection unit 11, and a path candidate containing no congestion-occurring link is specified as the optimum path from the plural path candidates selected by the path candidate selection unit 11 in an optimizing unit 12. Accordingly, even when the destination node is nearer to the self node, the optimum path selection can be performed, and a switching operation to a bypass path can be performed at high speed. In addition, the traffic amount based on topology information can be suppressed, and the large-scaling of the network can be supported.

10 Claims, 11 Drawing Sheets

HIGH-SPEED ROUTING CONTROL SYSTEM

BACKGROUND OF THE INVENTION

1. Field of the Invention

The present invention relates to a high-speed routing control system, and particularly to a high-speed routing control system for an ATM (Asynchronous Transfer Mode) connectionless communication apparatus for performing identification at IP (Internet Protocol) packets on the basis of only information of ATM layers by VPI (Virtual Path Identifier) and VCI (Virtual Channel Identifier) of the ATM layers in an ATM network, whereby transfer processing is performed with no delay of packet fabrication processing.

2. Description of the Related Art

Recently, it has been more increasingly required that the local connectionless characteristic of LAN (Local Area Network) at user sides is installed in a global ATM network to practically use the ATM network at high speed and at low price.

In the original ATM network, the connection setting is performed by signaling prior to the transfer of main signal data, and the detailed cost estimation and CAC (Connection Admission Control) calculation are performed every connection setting by each switch to select the optimum path from a plurality of candidates. At the same time, a resource to satisfy a QOS (Quality of Service) requirement from users is ensured.

In a routing protocol represented by PNNI (Private Network-to-Network Interface) and OSPF (Open Shortest Path First) in IP (Internet Protocol) communication, the "Dijkstra" algorithm is used to select the optimum path.

In the "Dijkstra" algorithm, the minimum path having the same cost is calculated on the basis of link information from all nodes to form a tree (route map: the minimum tree) extending from the root (self node) to each destination node. In order to perform the "Dijkstra" algorithm, each node is required to manage the state of links to be directly connected, that is, the topology as a path estimation and to notify the information thereof to all the nodes.

Therefore, in PNNI and OSPF, a method known as "Flooding" is defined as a method for notifying the link information. This method is used to quickly transmit a packet containing topology information into a constant area. This method has the following basic operation. That is, if the received information is newer than the information which has been owned by each node, the node distributes the new information to the others. However, if the received information is older, the node discards the information.

Figure 2:
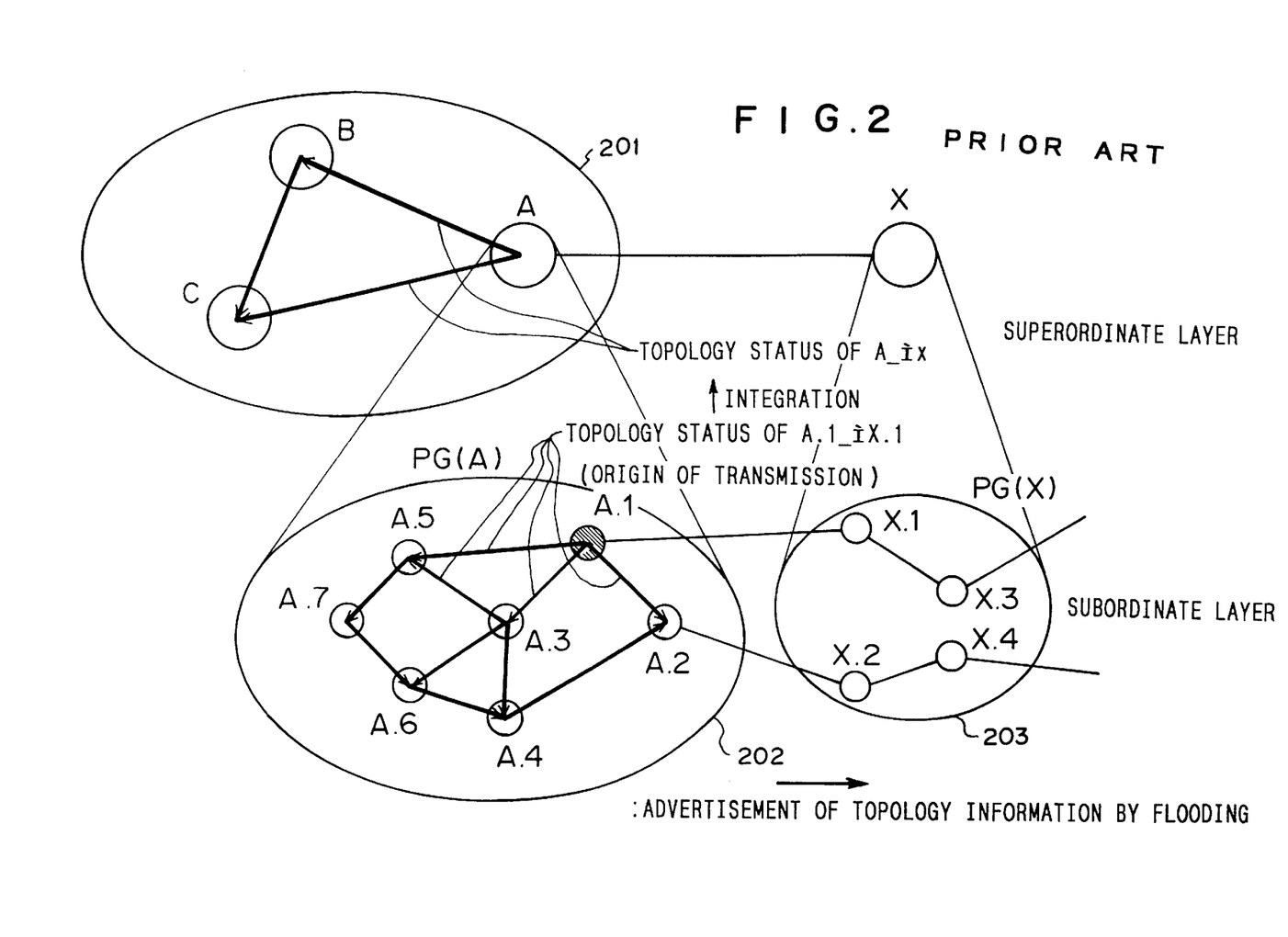
FIG. 2 is a diagram showing a conventional distribution method of topology information.

FIG. 2 is a conceptual diagram showing a method for distributing the topology information according to "Flooding" in PNNI. This method provides a propagation system which is characterized in that when the link status between A.1 and X.1 is varied, the node A.1 which detects the variation serves as a transmitter to advertize the information to a specific logical area PG (Peer Group: A) like "flood".

On the other hand, in a communication system of a normal connectionless network which is represented by an IP packet communication, there is no QOS request from an user, and any secondary optimizing processing to estimate a path by signaling processing is not performed at the network side. This type of connectionless communication system uses a manner of setting a direct connection path in addition to a direct connection path to enable dynamic switching operation to the bypass path in order to satisfy the communication request at maximum without discarding the packet even when the line is disconnected or one-way communication is instantaneously concentrated As a system with a function of selecting to the bypass path, there has been proposed a method of preparing plural candidates serving as plural bypass paths and monitoring a surplus band value every candidate path to switch to a path having a larger surplus band when the connectionless communication is performed in an ATM network (for example, Japanese Laid-open Patent Application No. Hei-3-242063, etc.).

Figure 3:
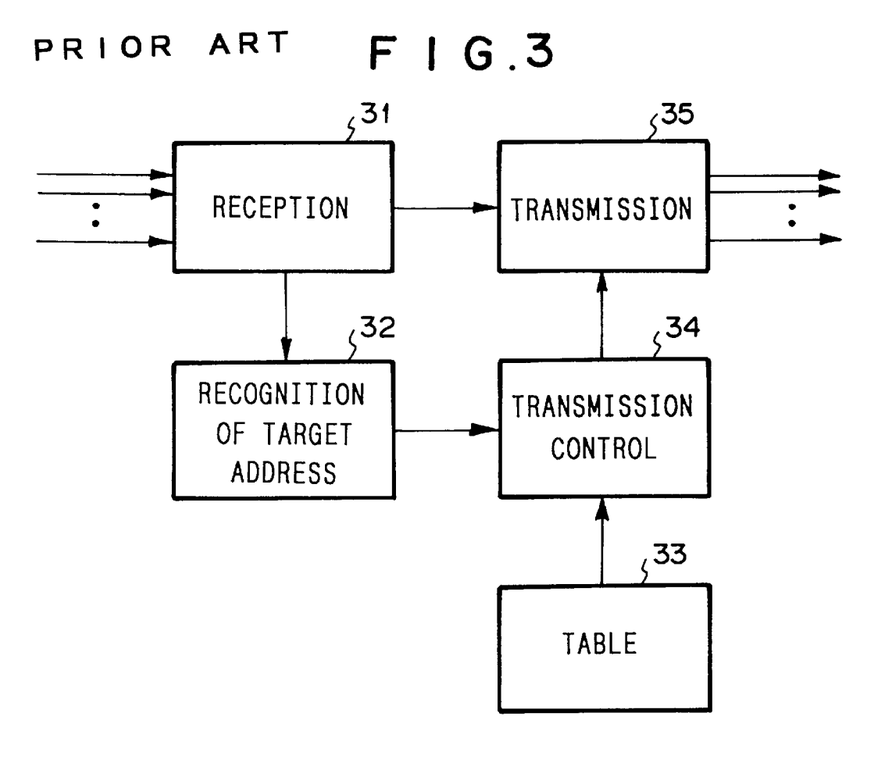
FIG. 3 is a block diagram showing an example of a conventional connectionless processing device.

FIG. 3 is a block diagram showing a conventional connectionless processing device in an ATM network. As shown in FIG. 3, the connectionless processing device comprises a receiver 31, a target address identifying unit 32, a table storing unit 33, a transmission control unit 34 and a transmission unit 35.

Figure 4:
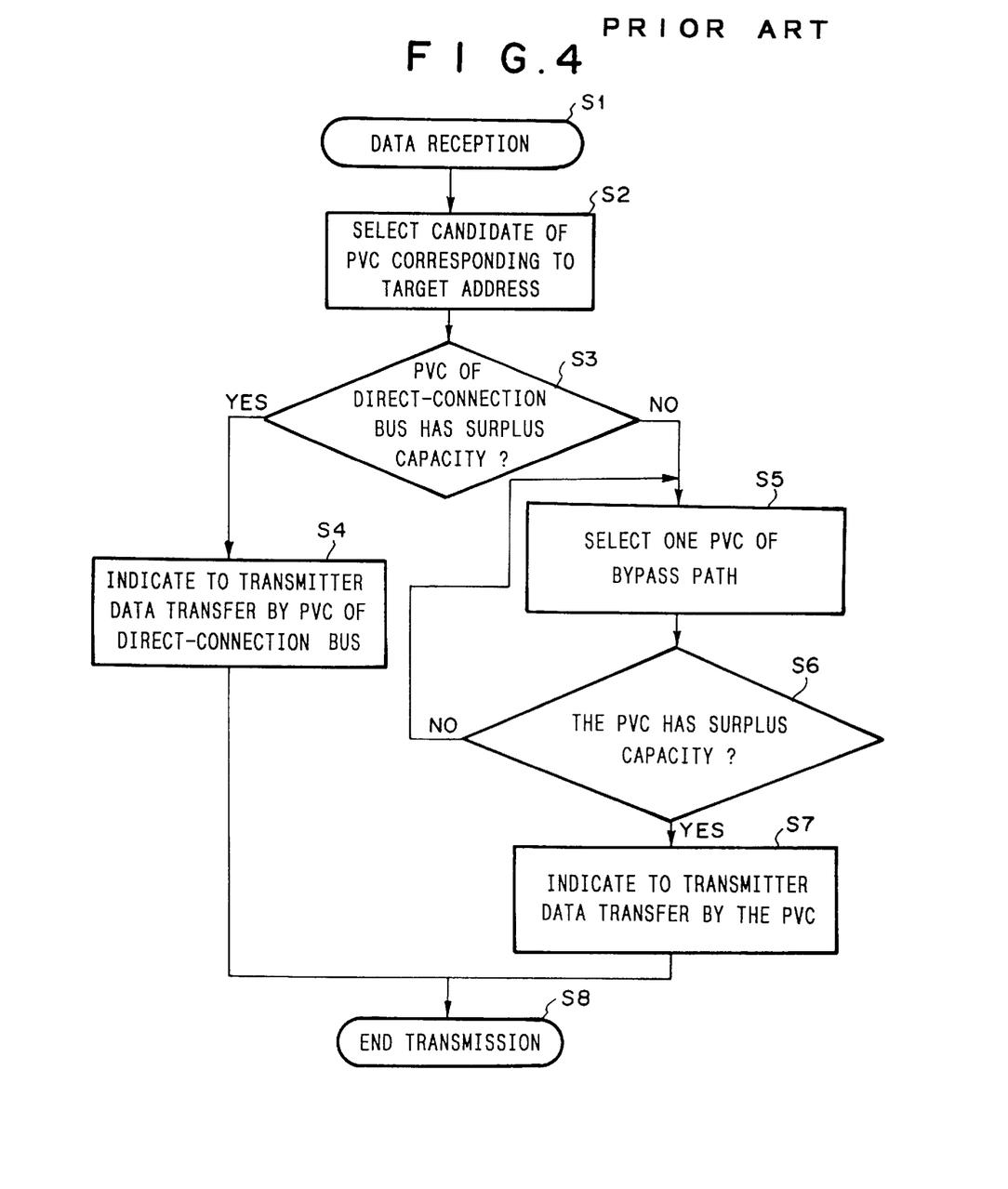
FIG. 4 is a flowchart showing the operation of the conventional connectionless processing device.

FIG. 4 is a flowchart showing the operation flow of the conventional transmission control unit. According to the conventional method, as shown in FIG. 4, upon reception of a connectionless packet (S1), a destination address is extracted from additive information of the packet to select PVC (Permanent Virtual Connection) corresponding to the destination address (S2).

As bypass path setting means, the use amount of PVCs of a direct-connect path and plural bypass paths are managed in the table storing unit 33 of FIG. 3 (S4, S5), and the most empty PVC is selected as a bypass path in the transmission control unit 34, thereby satisfying a communication request from an user (S3, S6, S7, S8).

However, the conventional routing control system as described above has the following problems.

A first problem resides in that the routing processing cannot be performed at high speed. That is, since the determination of a path on the basis of a link status type path estimation which is represented by the "Dijkstra" algorithm is performed by using a broadcast type of "Flooding" as a propagation system, the traffic amount which is needed to exchange routing information is increased and thus the information exchange is not frequently performed. Accordingly, this system has a limitation in real-time processing, and the optimum performance in the routing operation is lowered.

According to the PNNI signaling method in the ATM network, as precise check means, a secondarily detailed path estimation which satisfies QOS declared by an user is performed every connection setting by CAC (Connection Admission Control) processing or crank back processing, thereby determining the routing path. However, any delay occurs due to overhead of the signaling processing.

In order to enhance the precision of the permissible band value of each path, the conventional bypass path selection method needs complicated calculations such as prediction of the traffic variation characteristic, calculation of a cost function which is faithful to the real link topology variation, etc., and thus the speed of the judgment processing as to whether the switching to the bypass path is performed cannot be increased. The problem is caused by the fact that any method is not provided with processing means which gives high priorities to high speed and low delay to derive a bypass path which is the optimum solution within a predetermined time.

A second problem resides in that the traffic amount is increased in topology information propagation. The permissible band of each path which serves as the judgment criterion of a conventional cost estimation is varied at all times with being dependent on the buffer occupation rate of each connectionless processing device, and thus the traffic characteristic. Accordingly, the routing table is renewed in accordance with the variation characteristic of the permissible band of each path, and thus the routing control in the network falls into a confused state. Further, the traffic amount to advertise the topology variation to each connectionless communication device is increased. The problem is caused by the fact that the surplus band value is reflected to the cost information and "Flooding" is used as the propagation system.

A third problem resides in that the conventional routing control system cannot follow the large-scaling of the network. The direct cause of the problem is in that the propagation system is of "Flooding" type. Representing the number of connectionless communication devices by N, the topology information propagation traffic amount is increased in the order to $O(N^2)$.

The following three points are considered as means for controlling the traffic amount.

The first means is a method of providing a timer for suppressing the traffic amount in each connectionless communication device.

The second means is a method of annihilating a packet after lapse of a predetermined time by using the lifetime of the header portion of a packet for which the exchange of the topology information is performed.

The third means is a method of dividing and hierarchizing a logical area for which "flooding" is performed to thereby restrict an advertising range, and then transmitting summary information between areas, and between an subordinate area and a superordinate area.

FIG. 2 shows the "Flooding" method in a hierarchized method, and shows that two links of A.1-X.1 link and A.2-X.2 link exist between PG(A) 202–PG(X) 203 in the subordinate layer, however, in the superordinate layer topology information (topology aggregation) in which two links are integrated into one link between A-X is subjected to "Flooding".

The excessive traffic increase phenomenon can be moderated to some degree by the above control means. However, representing the number of divided areas by m, the topology information propagation traffic amount is in the order of $O(N^2/m)$ and thus it still trends to increase. Therefore, it is difficult to follow the large-scaling of the network. Further, when the number (m) of divided areas is increased to reduce the advertising range of the topology information, an error occurs during the integration process of the topology information, so that the accuracy of the routing is lost.

SUMMARY OF THE INVENTION

The present invention has been implemented to solve the above problems, and has an object to provide a high-speed routing control system which can select the optimum path even when a destination node is adjacent to a self node and increase the speed of the switching processing to a bypass path, and also can suppress the traffic amount due to topology information can be suppressed and follow the large-scaling of a network.

In order to attain the above object, a high-speed routing control system according to the present invention includes a path candidate selection unit for selecting plural path candidates to a destination node on the basis of physical connection information of links for connecting respective nodes, and an optimizing unit for selecting and specifying as the optimum path a path candidate containing no congested link from the plural path candidates selected by the path candidate selection unit on the basis of the congestion statuses of respective links located in predetermined adjacent areas. Accordingly, on the basis of the physical connection information on the links each connecting the respective nodes, the plural path candidates to the destination node are selected, and on the basis of the congestion status of each of links which belong to the predetermined adjacent areas, the path candidate which does not contain any link in which congestion occurs (i.e., any congested link) is selected and specified as the optimum path from the plural path candidates.

Further, on the basis of link cost values each of which indicates a predetermined selection priority of each link, the path candidate selection unit selects, from the paths leading to the destination node, the minimum cost path in which the total of link cost values of links constituting each path is minimum. In addition, it selects, from paths leading from the self node through each of nodes adjacent to the self node to the destination node, paths each having the total of the link cost values thereof which is smaller than the sum of the total of the link cost values of the minimum cost path and the double of the link cost value from the self node to the adjacent node. Accordingly, on the basis of the predetermined link cost values of the respective links, the minimum cost path having the minimum sum of the link cost values is selected from all the paths which lead to the destination node, and also the paths each having the total of the link cost values which is smaller than the sum of the total of the link cost values of the minimum cost path and the double of the link cost value from the self node to the adjacent node is selected from all the paths leading to the destination node.

Further, the optimizing unit receives predetermined monitor cells from adjacent nodes and discards from the congestion information stored in the monitor cells the congestion information of links accommodated n nodes which are far away from the self node by a predetermined number of links. In addition, it obtains the congestion information of the respective links accommodated in the residual nodes to specify the optimum path, and generates a new monitor cell on the basis of the obtained congestion information and the congestion information of each link accommodated in the self node to transmit the new monitor cell to the adjacent nodes.

Further, the optimizing unit transmits the monitor cell every predetermined period, and thus the monitor cell is transmitted every predetermined period.

DETAILED DESCRIPTION OF THE PREFERRED EMBODIMENTS

A preferred embodiment according to the present invention will be described hereunder with reference to the accompanying drawings.

Figure 1:
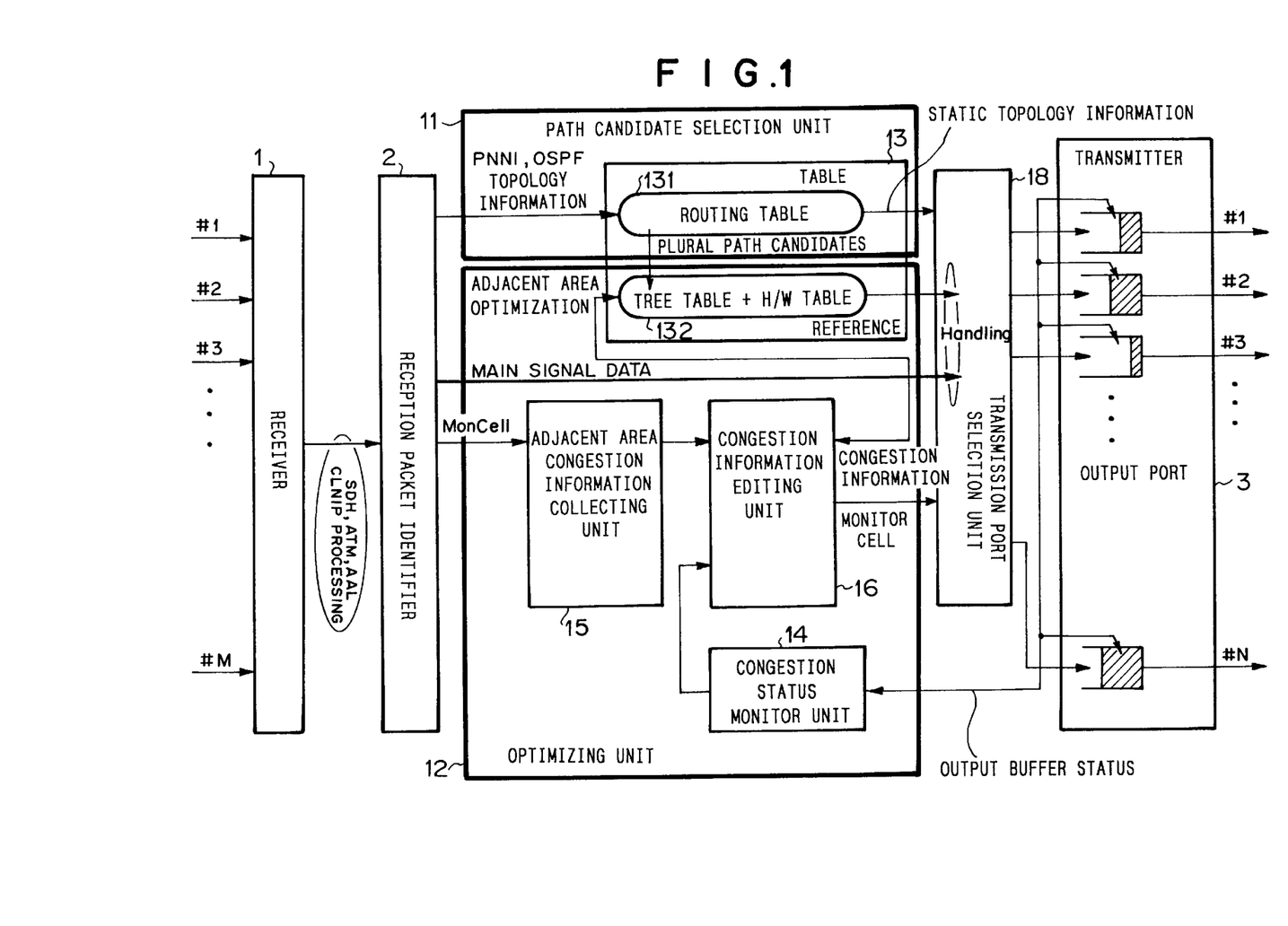
FIG. 1 is a block diagram showing a high-speed routing control system according to a first embodiment of the present invention.

FIG. 1 is a block diagram showing a high-speed routing control system of a connectionless communication device according to an embodiment of the present invention, and this system is a two-stage routing control systems comprising a basic routing unit 11 and an optimizing unit 12.

The high-speed routing control system of a connectionless communication device comprises a receiver 1 for receiving plural packet signal #1 to #M from pre-setting connectionless communication device, a reception packet identifier unit for receiving a SDH ATM, AAL CLNIP processing signal, identifying packet signals, and outputting a PNNI, OSPF topology information signal, main signal data to a transmission port selection unit 18, and a monitor cell signal to an adjacent area congestion information collecting unit 15 of a optimizing process unit 12, a basic routing unit of a path candidate selection process unit 11, the optimizing process unit 12, the transmission port selection unit 18 for handling and selecting for a optimizing route of transmitted packets and outputting the packets to the optimized route, and a transmitter for transmitting packets to the optimized route and one of the candidate rooters or stations.

The path candidate selection unit 11 has a routing table 131 in which physical connection information of each node is preset, and has a function of selecting general plural routing path candidates on the basis of a link state type path estimation algorithm used in a routing protocol which is represented by PNNI (Private Network-to-Network Interface) used in the ATM network and OSPF (Open shortest Path First) in the IP communication.

The optimizing unit 12 has a function of performing a further detailed path estimation on the plural routing path candidates which are selected in the path candidate selection unit 11 to select the optimum path in a specific neighboring area on a real-time basis. As shown in FIG. 1, the optimizing unit 12 comprises a table unit 13, a congestion status monitor unit 14, an adjacent area congestion information collecting unit 15 and a congestion information editing unit 16.

In the congestion status monitor unit 14, a cue length and a cue increasing rate of a self buffer are monitored to detect the congestion status every output port.

Figure 5:
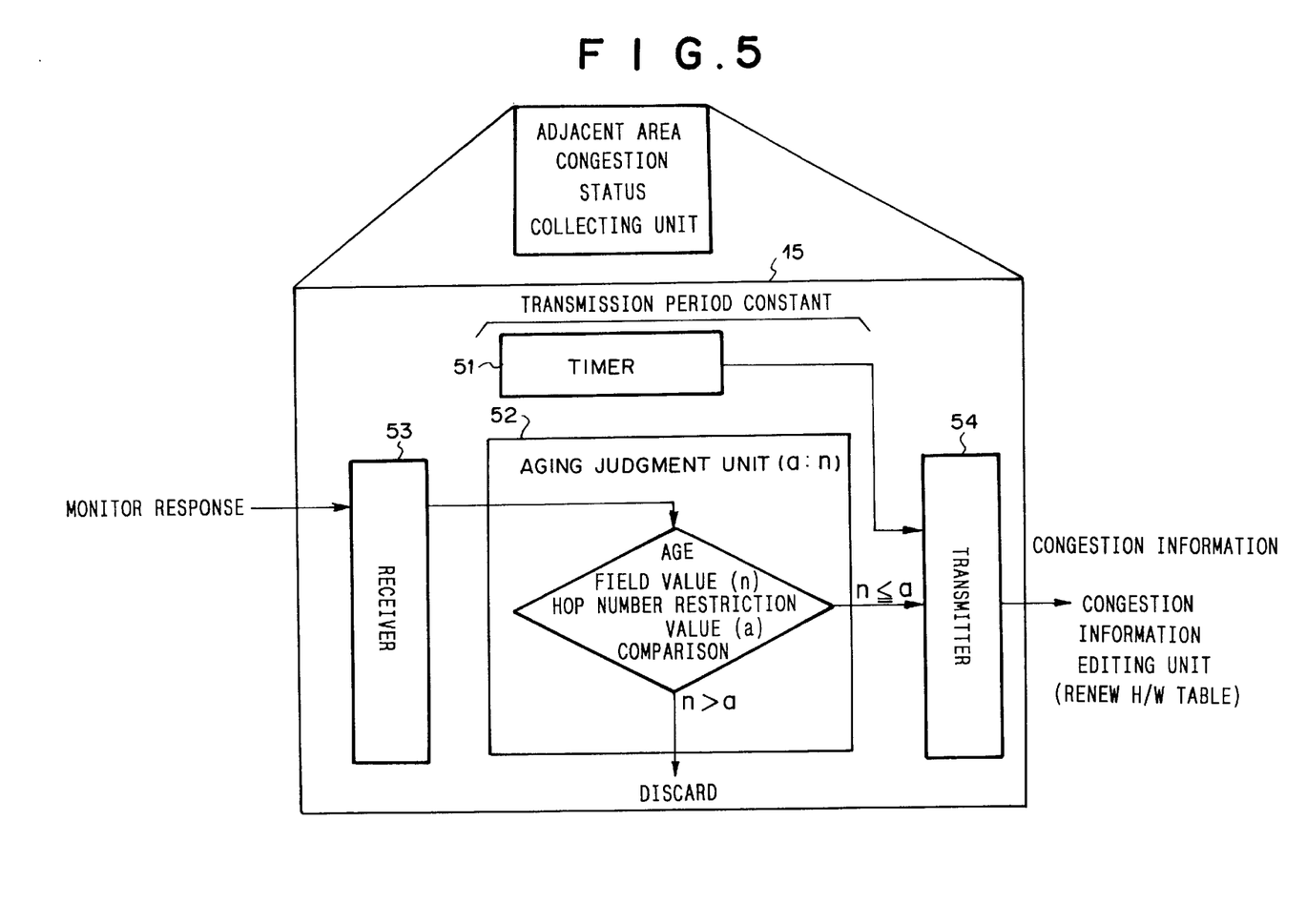
FIG. 5 is a block diagram showing an adjacent area congestion status collecting unit.

The adjacent area information collecting unit 15 comprises a transmitter 54 for transmitting the congestion status monitor cell, a receiver 53 for receiving the congestion status monitor, and an aging judgment unit 52 for adding the distance of the received congestion status monitor cell, that is, the number of via-links (Hop number) to perform an aging judgment. Further, the adjacent area information collecting unit 15 has a timer 51 and has a function of generating a congestion status monitor cell at a fixed period at the self timing and transmitting it to the adjacent connectionless communication device.

Accordingly, the adjacent area information collecting unit 15 receives a monitor cell having congestion status information from an adjacent connectionless communication device, and if the congestion status is varied, it searches path candidates in which the links to the adjacent connectionless communication device are excluded from the tree table 132 of the table 13 as described later, thereby selecting a quasi-optimum path.

Further, by referring to the tree table 132, the alteration of the path candidate is reflected to the H/W table of a hardware (memory).

The monitor cell which is collected by each connectionless communication device is provided with information indicating a buffer congestion status every output unit of the adjacent connectionless communication device, and a field indicating the Hop number of the connectionless communication devices through which the communication is passed until the communication arrives at the destination node. The field information is used for the aging judgment to suppress the advertisement to the outside of the adjacent areas by discarding the information when the Hop number of connectionless communication devices via which the communication passes reaches a predetermined number.

In the aging judgment unit 52, the age field value is compared with the restriction value (a) of the Hop number being managed to make a judgment as to whether it should obtain and distribute to the other adjacent nodes, and selects one of holding and discarding.

The congestion information editing unit 16 has a function of referring the tree table of the table 13 thereof to edit the monitor cell to be distributed.

Figure 6:
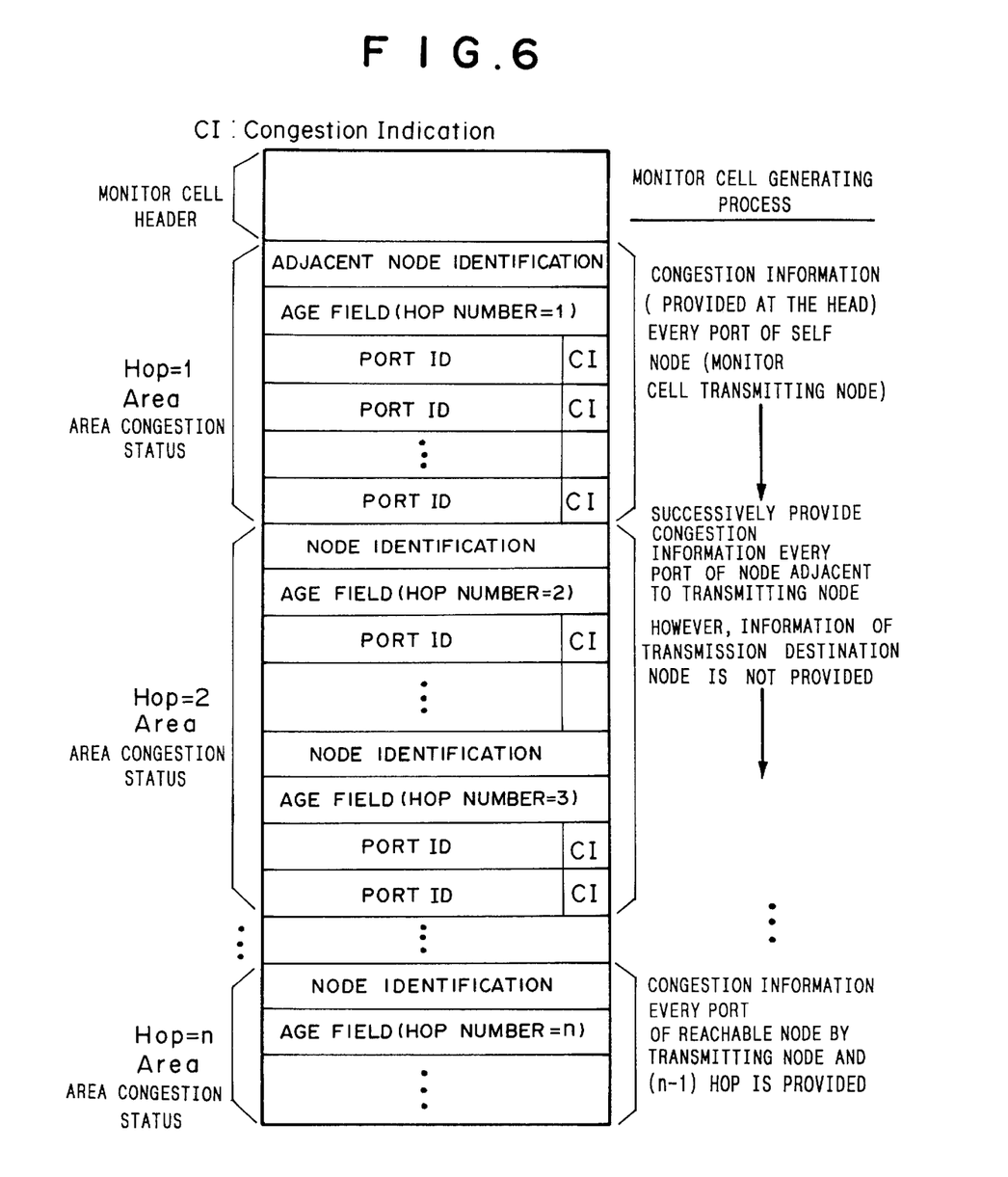
FIG. 6 is a diagram showing a format of a congestion status monitor cell.

FIG. 6 shows the format of the monitor cell. As shown in FIG. 6, the congestion status thereof is described at the head, and subsequently the information after the aging judgment in the adjacent area information collecting unit is inserted. The monitor cell is generated by the format thus formed. This is characterized in that the congestion information is described in accordance with the distance (Hop number) from the connectionless communication device.

Next, the operation of the present invention will be described with reference to FIG. 7.

Figure 7:
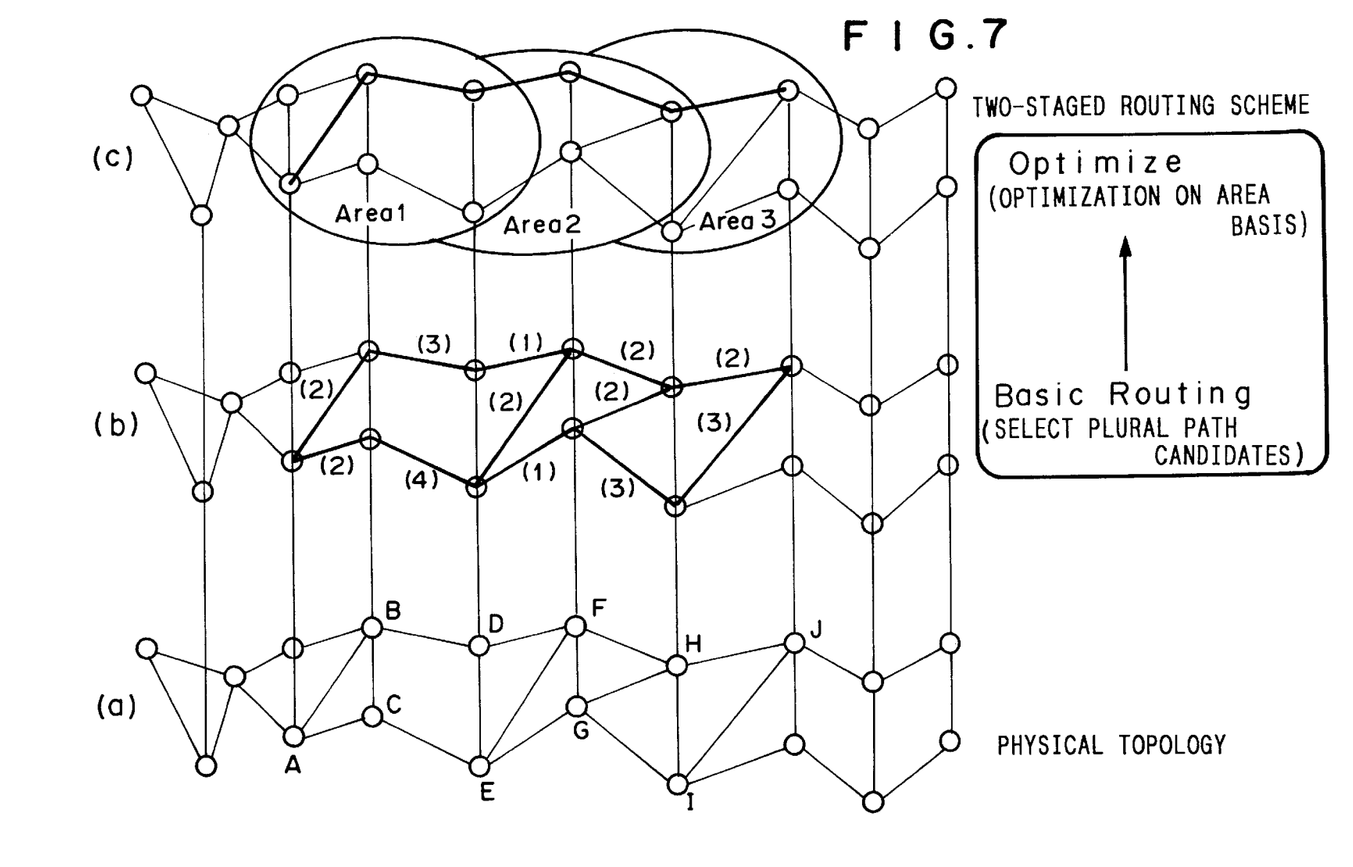
FIG. 7 is a diagram showing the operation of a high-speed routing control system according to the present invention.

FIG. 7 is a conceptual diagram showing the operation of the high-speed routing control system to which the present invention is applied, wherein (a) shows the physical topology of the connectionless communication device, (b) shows the operation of the path candidate selection unit 11, and (c) shows the operation of the optimizing unit 12. In the following description, the routing control operation when the communication is performed between A station and J station will be typically represented to described the operation of the present invention.

In a construction process of a network, the reciprocal of each link speed, the delay characteristic, the discard rate, etc. are estimated to allocate link cost values indicating selection priorities of respective links to the respective links in advance. The numeral in parenthesis of (b) of FIG. 7 indicates the link cost value of each link.

First, the path candidate selection unit 11 of each connectionless communication device refers to the routing table 11a to obtain the link cost value of each link, and forms a route map (minimum tree) leading from the A station as a root to the destination J station on the basis of the link cost values thus obtained by using the "Dijkstra" algorithm. Further, it calculates plural paths as bypass path target candidates. The "plural paths" in the above description are selected to have the same value as the total of the link cost values of the minimum cost path or selected in consideration of the condition of "Loop free" as described later. The plural paths between the A–J stations which are selected by the above processing are indicated by solid lines of (b) of FIG. 7.

In the optimizing unit 12, the optimization in consideration of the congestion status in the adjacent areas is performed on the plural candidate paths which are given by the path candidate selection unit 11, and specifies the routing path. The optimum path which is selected by the above processing is indicated by a solid line of (c) of FIG. 7.

Figure 9:
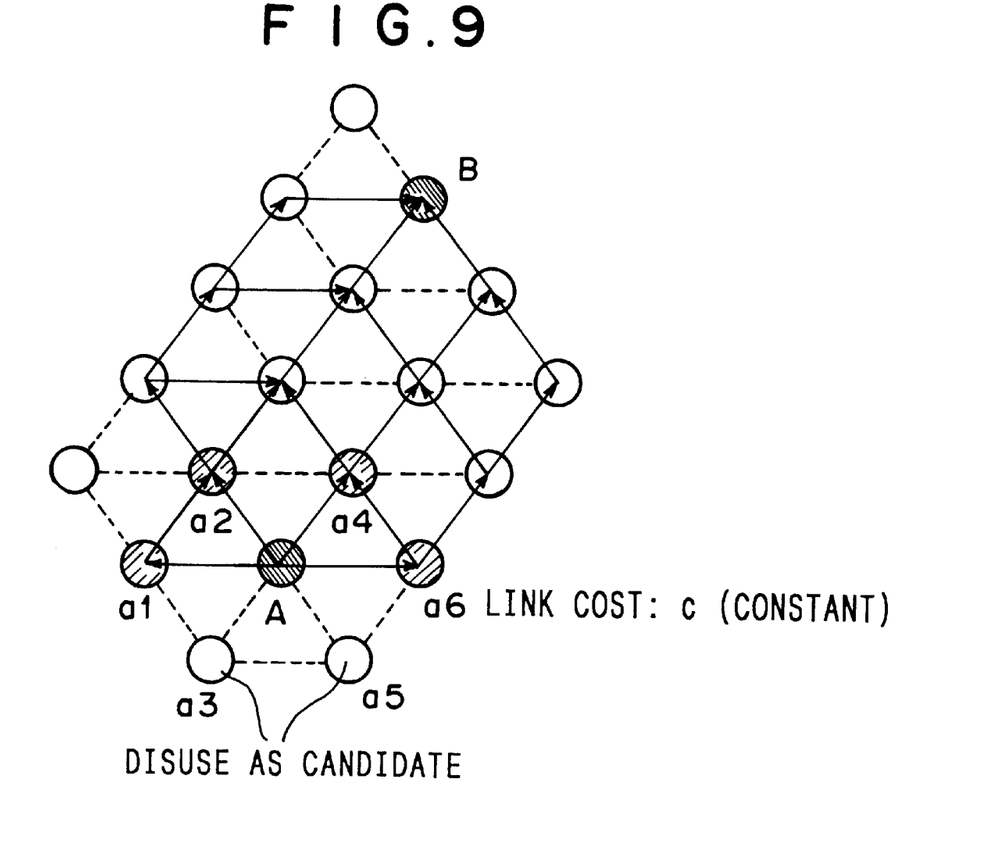
FIG. 9 is a diagram showing a plural-paths selection process.

Here, referring to FIG. 9, the process of selecting plural candidates in the path candidate selection unit 11a will be described. FIG. 9 is a diagram showing the plural path selection process.

The plural path candidates are selected by the basic routing unit 11, and these candidates are selected so that no duplicative path, that is, no looping occurs.

Now, assuming that the total of the link cost values of the respective links from the A station until the B station is represented by NA and the inter-node link cost of all the nodes is set to c (constant value), the total of the minimum link cost values is represented by NA=4×c. Further, there exist a1 to a6 stations which are adjacent to the A station, and the minimum link cost value between A-an stations (n:1 to 6) is equal to c.

When the link cost value between an-B stations is equal to Nan (n:1 to 6) and the transfer is performed from the A station to the B station, no looping occurs even when the transfer is performed via an, so that the following inequality is satisfied in consideration of the condition that the transfer does not return to the A station:

$$Nan<NA+c=5c \quad (1)$$

At this time, the link cost value via the an station to the B station which is viewed from the A station is expressed by the following equation:

$$Nan+c<NA+c+c=6c \quad (2)$$

Accordingly, as the candidates serving as the targets of the plural paths are provided the following two types of paths. One type is the path having the same minimum link cost value N, that is, the minimum cost path. The other type is a path in which when the minimum link cost value until an adjacent station is equal to c, the minimum link cost value via the station between the A and B stations is smaller than N+2×c, that is, "Loop Free".

In the case of FIG. 9, in the plural candidate selection process between A-B, the node which can be next selected from the A station is limited to four adjacent nodes of a1, a2, a4, a6. The path along which the transfer from the A station is passed through a3 or a5 to the B station is minimum, however, the link cost value thereof is equal to 6c. Therefore, from the equation (2), it is excluded from the path candidates between A–B stations.

Figure 8:
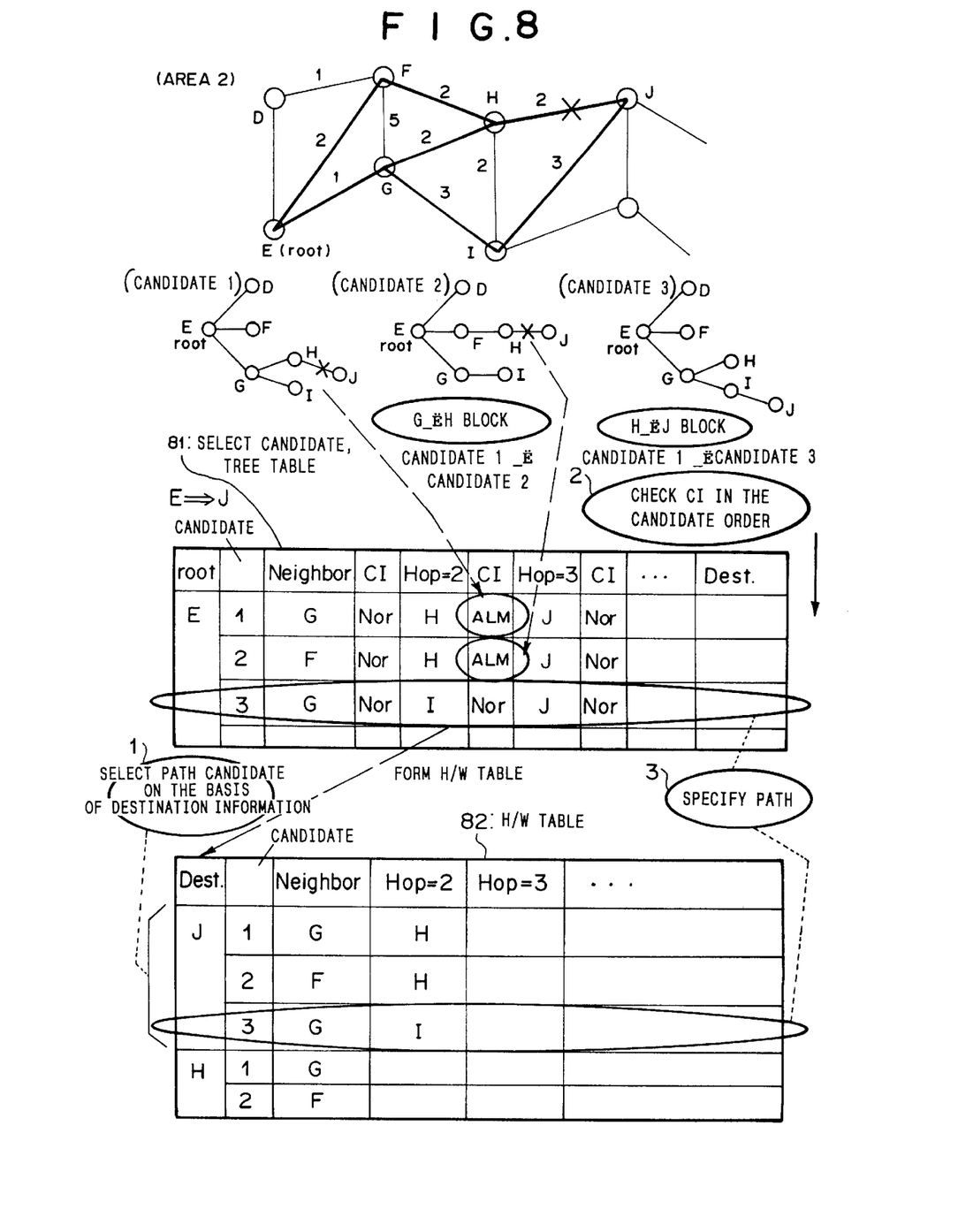
FIG. 8 is a diagram showing a process of forming a tree table and H/W table.

FIG. 8 show the tree-tabling process of the path candidates selected by the basic routing unit 11, and the process in which the H/W table used in the actual routing in a transmission port selection unit 18 specifies the quasi-optimum path by referring to the tree table.

For example, when attention is paid to an E station belonging to Area 2 of (c) of FIG. 7, the tree table 81 thus formed manages the optimum path from the node thereof (self node) (E) serving as a root to all the other nodes serving as destination nodes on an output port basis with a CI (Congestion Indication) flag.

In the case of FIG. 8, in addition to the optimum path of "candidate 1", those paths which are obtained on the basis of the "Dijkstra" calculation by excluding (blocking) G-H link and H-J link are selected as "candidate 2" and "candidate 3".

The CI information is collected by the monitor cell, and the specification of the quasi-optimum path is reflected to the H/W table 82 after the congestion status is checked by referring the CI flag of the tree table 81.

Here, when the congestion is judged to occur in the buffer of the output port of the H-J link in the path leading from the node E to the node J, a CI (Congestion Indication) flag at the place concerned on the tree table 81 is renewed from "Nor(Normal) (Congestion Release Status)" to "ALM (Alarm) (Congestion Occurring Status)". Accordingly, at the actual routing time, the path of G-I-J of the "Candidate 3" is selected.

The procedure of forming the H/W table 82 will be described.

First, the destination address corresponding to the position of a leaf of the tree table 81 which is provided by the basic routing unit 11 is searched (step 1) to determine the transfer destination port of the next state which corresponds to the destination address concerned. At this time, the congestion status of the path information is checked in the order of the candidates which are provided by the tree table 81 (step 2), thereby specifying the optimum path (step 3).

Accordingly, in the transmission port selection unit 18 of FIG. 1, the first optimum path is selected by referring to the H/W table 82 in such a steady state that there is no risk of buffer overflow in the connectionless communication devices within the adjacent area. On the other hand, when it is judged that local buffer overflow occurs in the adjacent connectionless communication devices, any (second to n-th) output path which excludes any congestion-occurring path from the given plural candidates is specified to control a temporary bypass operation on a packet basis.

As described above, in the path candidate selection unit 11, the plural path candidates leading to the destination node are selected on the basis of the physical connection information of links between the respective nodes, and in the optimizing unit 12, the path candidate which does not contain the congestion-occurring links is specified as the optimum path from the plural path candidates selected by the path candidate selection unit 11 on the basis of the congestion status of each link which belongs to the adjacent area. Therefore, the path candidate is selected on the basis of the static information which is little varied in the path candidate selection operation, so that the processing time needed to select the path candidates can be shortened. Further, the optimum path is specified on the basis of the presence or absence of the congestion-occurring link from these path candidates, and thus the processing time needed to specify the optimum path can be shortened, and the routing control can be processed at high speed as a whole.

In the path candidate selection unit, the minimum cost path having the minimum total of the link cost values of the links constituting each path is selected from the paths leading to the destination node, and paths each having the total of the link cost values thereof which is smaller than the sum of the total of the link cost values of the minimum cost path and the double of the link cost value from the self node to the adjacent node is further selected from paths leading from the self node through each of nodes adjacent to the self node to the destination node. Therefore, by the relatively simple processing, paths which are duplicatively passed through the self node can be selected in advance, and thus the optimum path selection can be performed even when the destination node is relatively nearer to the self node.

Figure 10:
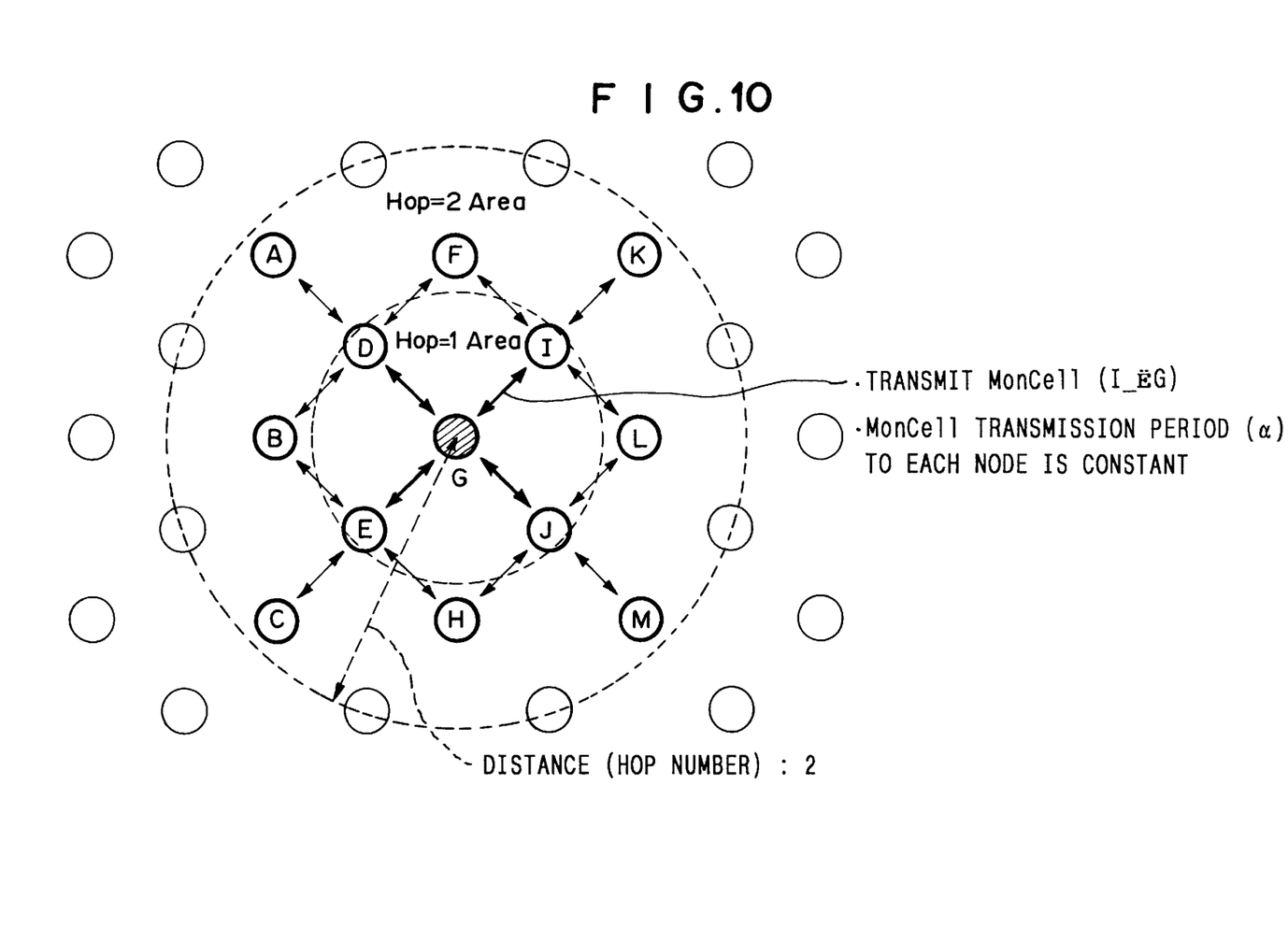
FIG. 10 is a diagram showing the operation of a congestion status propagation system of an optimizing unit.

Next, the operation of the optimizing unit 12 will be described with reference to FIG. 10. FIG. 10 is an operational diagram showing the feature of the congestion status propagation system in the optimizing unit 12 to which the present invention is applied.

A node G constituting a grid type network as shown in FIG. 10 is considered. First, the node G transmits a congestion status monitor cell to a node I at the self timing. The congestion status monitor cell transmitted from the node G to the node I contains the current congestion status of the node G at the head thereof while added with the congestion status of adjacent nodes D,E, J which are currently obtained by the node G.

Further, the node G likewise transmits the congestion status monitor cell to the other adjacent nodes D, E, J, so that the advertising range of the congestion status of the node G is closed within an area having the distance a from the node G at the center thereof (in this embodiment, Age restriction hop number=2).

The node I which is adjacent to the node G also transmits a monitor cell to the node G while the monitor cell is provided with the self current congestion status of the node I at the head thereof and added with the congestion statuses of the adjacent nodes F, L, K which are currently obtained by the node I. The other adjacent nodes D, E, J perform the same operation, and the node G obtains the congestion statuses of nodes which exist in the area of the distance a around the node G.

According to the congestion status propagation system in the optimizing unit to which the present invention is applied, the congestion information propagation traffic amount is increased in proportion to the increase in number of the connectionless communication devices: O(N), and the rate of the increase of the traffic amount is kept constant.

Figure 11:
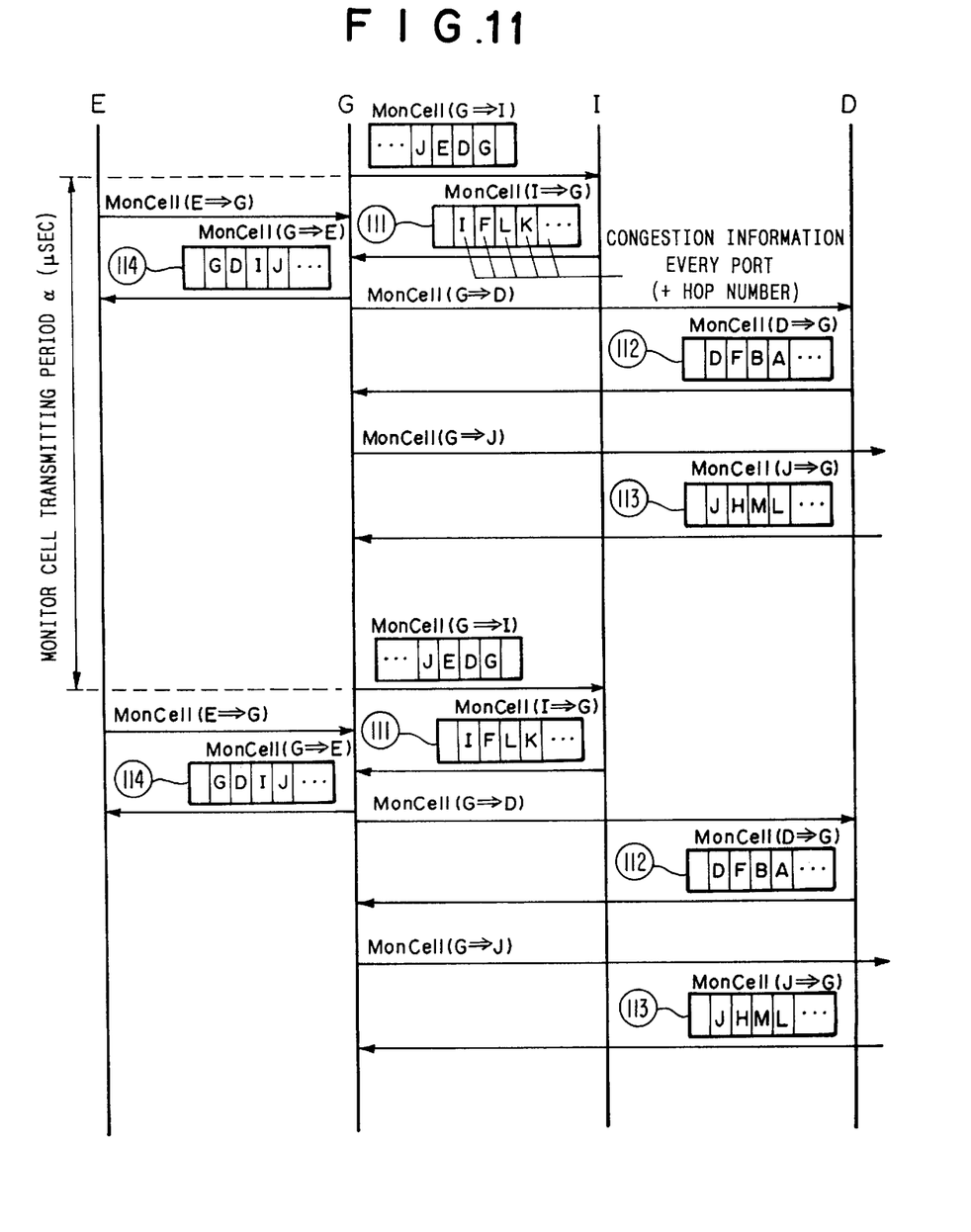
FIG. 11 is a time-chart showing a congestion status monitor cell transmitting timing.

FIG. 11 is a time-chart showing the congestion status monitor cell transmitting timing of the node G in the grid type network of FIG. 10.

The transmitting timing of the congestion status monitor cell indicates that each node transmits the congestion status monitor cell at a constant period α ($\mu$sec). The period is synchronized with the clock in each connectionless communication device.

In this case, the congestion information of each path of the tree table 81 is renewed on the basis of congestion status monitor cells 111 to 113 received from the nodes I, D, J at a period timing by the adjacent area congestion status collecting unit 15 as described above (FIGS. 5 and 6).

Thereafter, the congestion status monitor cell 114 which is addressed to the node E is generated on the basis of the congestion information, and transmitted at a next period timing.

Accordingly, the information in the congestion status notifying cell becomes older in proportion to the distance of the connectionless communication device serving as an information source, and past information of "distance (a) x period (α)" can be obtained even at the farthest place. As a node is more adjacent, the congestion information of the node is later, and it is judged as being proper as information to be obtained.

As described above, in the optimizing unit 12, a predetermined monitor cell is received from an adjacent node to discard from the congestion information accommodated in the monitor cell the congestion information of links accommodated in nodes which are far away from the self node by a predetermined link number, and obtain the congestion information of each link accommodated in each of the residual nodes, thereby specifying the optimum path, and a new monitor cell is generated on the basis of the congestion information thus obtained ant he congestion information of each link accommodated in the self node, and transmitted to the adjacent nodes. Therefore, the advertising range of the monitor cell can be limited with in a physical adjacent area, and the rate of the traffic increase due to the monitor cells to collect the congestion information can be kept constant to the increase of the node number, and the large-scaling of the network can be supported.

Further, the monitor cell is transmitted every predetermined period, so that the cell delay fluctuation of the monitor cell can be suppressed and variation of the buffer occupation rate of a link buffer which is owned by each node can be suppressed. In addition, even when a lot of monitor cell are erroneously transmitted from a part of nodes, the monitor cell is transmitted from the adjacent nodes at a normal period, so that the "flooding" of the monitor cell traffic to the overall network can be prevented.

As described above, according to the present invention, the path candidate selection unit for performing a general routing operation and an optimizing unit for specifying the optimum path in a predetermined adjacent area are provided. In the path candidate selection unit, the plural path candidates each leading to the destination node are selected on the basis of the physical connection information of links connecting respective nodes. In the optimizing unit, the path candidate which does not contain congestion-occurring links is specified as the optimum path from the plural path candidates on the basis if the congestion status of each link belonging to the predetermined adjacent area. Therefore, the path candidates are selected on the basis of the static information which is little varied in the path candidate selection process, and thus the processing time needed to select the path candidates can be shortened. In addition, the optimum path is specified from these path candidates on the basis of the presence or absence of the congestion-occurring link, so that the processing time needed to specify the optimum path can be shortened and the routing control can be performed at high speed as a whole.

Further, in the path candidate selection unit, on the basis of link cost values each of which indicates a predetermined selection priority of each link, the minimum cost path in which the total of link cost values of links constituting each path is minimum is selected from the paths leading to the destination node. In addition, it selects, from paths leading from the self node through each of nodes adjacent to the self node to the destination node, paths each having the total of the link cost values thereof which is smaller than the sum of the total of the link cost values of the minimum cost path and the double of the link cost value from the self node to the adjacent node. Accordingly, by the relatively simple processing, the paths which duplicatively passes through the self node can be selected in advance, and thus even when the destination node is relatively near to the self node, the optimum path can be selected.

Still further, in the optimizing unit 12, predetermined monitor cells are received from adjacent nodes and the congestion information of links accommodated in nodes which are far away from the self node by a predetermined number of links are discarded from the congestion information stored in the monitor cells. In addition, the congestion information of the respective links accommodated in the residual nodes is obtained to specify the optimum path, and a new monitor cell is generated on the basis of the obtained congestion information and the congestion information of each link accommodated in the self node to transmit the new monitor cell to the adjacent nodes. Therefore, the advertising range of the monitor cell can be limited within a physical adjacent area, and the rate of the traffic increase due to the monitor cell to collect the congestion information is kept constant to the increase in number of the nodes at all times, so that the large-scaling of the network can be supported.

In addition, since the monitor cell is transmitted every predetermined period, the cell delay fluctuation of the monitor cell can be suppressed, and the variation of the buffer occupation rate of the link buffer owned by each node can be suppressed. Further, even when a lot of monitor cells are erroneously transmitted from a part of nodes, the monitor cells are transmitted from the adjacent nodes at a normal period, so that the flooding of the monitor cell traffic to the overall network can be prevented.

What is claimed is:

1. A high-speed routing control system for selecting a packet transfer path when a packet containing connectionless data is transferred to a destination node from a self node through a connection type ATM network, said system comprising:

a path candidate selection unit for selecting a plurality of path candidates each leading to the destination node on the basis of physical connection information of links connecting respective nodes in said network; and an optimizing unit for selecting from said plurality of path candidates and specifying as an optimum path a path candidate containing no congested link on the basis of a congestion status of each link belonging to a predetermined area adjacent to the self node.

2. The high-speed routing control system as claimed in claim 1, wherein on the basis of link cost values which indicate a predetermined selection priority of each link, said path candidate selection unit selects, from said plurality of path candidates leading to the destination node, a minimum cost path in which the total of link cost values of links constituting each path is minimized, and wherein said path candidate selection unit also selects, from paths leading from the self node, through each of nodes adjacent to the self node, to the destination node, those paths where the total of the link cost values thereof is smaller than the sum of the total of the link cost values of the minimum cost path and twice the link cost value from the self node to the adjacent node.

3. The high-speed routing control system as claimed in claim 1, wherein said optimizing unit receives predetermined monitor cells from adjacent nodes and discards from congestion information stored in the monitor cells congestion information of links accommodated in nodes which are distanced from the self node by a predetermined number of links, and wherein said optimizing unit obtains congestion information of the respective links accommodated in the remaining nodes to specify the optimum path and generates a new monitor cell on the basis of the obtained congestion information and the congestion information of each link accommodated in the self node to transmit the new monitor cell to the adjacent nodes.

4. The high-speed routing control system as claimed in claim 3, wherein said optimizing unit transmits the new monitor cell every predetermined period.

5. The high-speed routing control system as claimed in claim 1, wherein said path candidate selection unit further comprises a routing table in which physical connection information of each node is preset, and a means for selecting general plural routing path candidates on the basis of a link state type path estimation algorithm used in a routing protocol which is represented by PNNI (Private Network-to-Network Interface) used in the ATM network and OSPF (Open shortest Path First) in IP communication.

6. The high-speed routing control system as claimed in claim 1, wherein said optimizing unit further comprises a means for performing a further detailed path estimation on said plurality of path candidates which are selected in said path candidate selection unit to select the optimum path in a specific neighboring area on a real-time basis.

7. The high-speed routing control system as claimed in claim 1, wherein said optimizing unit comprises a table unit having a tree type table specifying a quasi-optimum path by referring to adjacent stations and sub-adjacent stations like a tree, and a hardware table formed by processes in which a destination address corresponding to the position of a leaf of the tree table is searched to determine a transfer destination port of the next state which corresponds to the destination address concerned, the congestion status of the path information being checked in the order of the candidates which are provided by the tree table, thereby specifying the optimum path.

8. The high-speed routing control system as claimed in claim 6, wherein said optimizing unit comprises a table unit having a tree type table specified the quasi-optimum path by referring to adjacent stations and sub-adjacent stations like a tree, and a hardware table formed by processes in which a destination address corresponding to the position in a leaf of the tree table is searched to determine a transfer destination port of the next state which corresponds to a destination address concerned, the congestion status of the path information is checked in the order of the candidates which are provided by the tree table, thereby specifying the optimum path.

9. A high-speed routing control system for selecting a packet transfer path when a packet containing connectionless data is transferred to a destination node from a self node through a connection type ATM network, said system comprising:

a path candidate selection unit for selecting a plurality of path candidates each leading to the destination node on the basis of physical connection information of links connecting respective nodes in said network; and an optimizing unit for selecting from said plurality of path candidates and specifying as an optimum path a path candidate containing no congested link on the basis of a congestion status of each link belonging to a predetermined area adjacent to the self node;

wherein said optimizing unit comprises a congestion status monitor unit in which a cue length and a cue increasing rate of a self buffer are monitored to detect the congestion status of every output port, an adjacent area information collecting unit which comprises a transmitter for transmitting the congestion status monitor cell, a receiver for receiving the congestion status monitor, and an aging judgment unit for adding the distance of the received congestion status monitor cell representing the number of via-links (Hop number) to perform an aging judgment, and a congestion information editing unit which has a means of referring to a tree table which has a tree type table specifying a quasi-optimum path by referring to adjacent stations and sub-adjacent stations like a tree, and a hardware table.

10. A high-speed routing control system for selecting a packet transfer path when a packet containing connectionless data is transferred to a destination node from a self node through a connection type ATM network, said system comprising:

a path candidate selection unit for selecting a plurality of path candidates each leading to the destination node on the basis of physical connection information of links connecting respective nodes in said network; and an optimizing unit for selecting from said plurality of path candidates and specifying as an optimum path a path candidate containing no congested link on the basis of a congestion status of each link belonging to a predetermined area adjacent to the self node;

wherein said optimizing unit further comprises a means for performing a further detailed path estimation on said plurality of path candidates which are selected in said path candidate selection unit to select the optimum path in a specific neighboring area on a real-time basis; and wherein said optimizing unit further comprises a congestion status monitor unit in which a cue length and a cue increasing rate of a self buffer are monitored to detect the congestion status of every output port, an adjacent area information collecting unit which comprises a transmitter for transmitting the congestion status monitor cell, a receiver for receiving the congestion status monitor, and an aging judgment unit for adding the distance of the received congestion status monitor cell representing the number of via-links (Hop number) to perform an aging judgment, and a congestion information editing unit which has a means of referring to a tree table which has a tree type table specifying a quasi-optimum path by referring to adjacent stations and sub-adjacent stations like a tree, and a hardware table.

\* \* \* \* \*